United States Patent [19]
Walsh

[11] Patent Number: 6,001,502
[45] Date of Patent: Dec. 14, 1999

[54] CURRENT CONDUCTING END PLATE OF FUEL CELL ASSEMBLY

[75] Inventor: Michael M. Walsh, Fairfield, Conn.

[73] Assignee: Plug Power, L.L.C., Latham, N.Y.

[21] Appl. No.: 08/884,452

[22] Filed: Jun. 27, 1997

[51] Int. Cl.$^6$ .................................................. H01M 2/00
[52] U.S. Cl. .......................................................... 429/34
[58] Field of Search .............................. 429/34, 36, 38, 429/42; 428/624

[56] References Cited

U.S. PATENT DOCUMENTS

| | | | |
|---|---|---|---|
| 3,318,736 | 5/1967 | Barber | 136/86 |
| 3,657,015 | 4/1972 | Veatch et al. | 136/83 R |
| 3,717,505 | 2/1973 | Unkle et al. . | |
| 3,779,811 | 12/1973 | Bushnell et al. | 136/86 R |
| 4,175,165 | 11/1979 | Adlhart . | |
| 4,197,178 | 4/1980 | Pellegri et al. | 204/255 |
| 4,212,929 | 7/1980 | Grevstad et al. | 429/37 |
| 4,719,157 | 1/1988 | Tsutsumi et al. | 429/34 |
| 4,948,681 | 8/1990 | Zagrodnik et al. . | |
| 5,362,578 | 11/1994 | Petri et al. | 429/35 |
| 5,486,430 | 1/1996 | Gorbell et al. | 429/35 |
| 5,509,942 | 4/1996 | Dodge | 29/623.2 |
| 5,514,486 | 5/1996 | Wilson | 429/30 |
| 5,547,777 | 8/1996 | Richards | 429/32 |
| 5,549,983 | 8/1996 | Yamanis | 429/32 |
| 5,607,786 | 3/1997 | Guthrie et al. | 429/34 |
| 5,635,039 | 6/1997 | Cisar et al. | 204/252 |

FOREIGN PATENT DOCUMENTS

| | | |
|---|---|---|
| 0 143 300 | 6/1985 | European Pat. Off. . |
| 0 198 483 | 11/1986 | European Pat. Off. . |
| 59-098473 | 6/1984 | Japan . |
| 63-108678 | 5/1988 | Japan . |
| 2-281567 | 11/1990 | Japan . |
| 1 358 243 | 7/1974 | United Kingdom . |
| 2 085 475 | 4/1982 | United Kingdom . |
| WO 96 18217 | 6/1996 | WIPO . |

*Primary Examiner*—Maria Nuzzolillo
*Assistant Examiner*—J. O'Malley
*Attorney, Agent, or Firm*—Heslin & Rothenberg, P.C.

[57] ABSTRACT

A fuel cell assembly has a current conducting end plate with a conductive body formed integrally with isolating material. The conductive body has a first surface, a second surface opposite the first surface, and an electrical connector. The first surface has an exposed portion for conducting current between a working section of the fuel cell assembly and the electrical connector. The isolating material is positioned on at least a portion of the second surface. The conductive body can have support passage(s) extending therethrough for receiving structural member(s) of the fuel cell assembly. Isolating material can electrically isolate the conductive body from the structural member(s). The conductive body can have service passage(s) extending therethrough for servicing one or more fluids for the fuel cell assembly. Isolating material can chemically isolate the one or more fluids from the conductive body. The isolating material can also electrically isolate the conductive body from the one or more fluids.

29 Claims, 3 Drawing Sheets

6,001,502

CURRENT CONDUCTING END PLATE OF FUEL CELL ASSEMBLY

STATEMENT OF GOVERNMENT RIGHTS

The Government of the United States of America has rights in this invention pursuant to Contract No. DE-AC02-94CE50389 awarded by the U.S. Department of Energy.

TECHNICAL FIELD

This invention relates, generally, to fuel cell assemblies and, more particularly, to end plates for providing electrical conduction and fluid service interfaces for fuel cell assemblies.

BACKGROUND ART

A Proton Exchange Membrane ("PEM") fuel cell converts the chemical energy of fuels such as hydrogen and air/oxygen directly into electrical energy. The PEM is a solid polymer electrolyte that permits the passage of protons ($H^+$ ions) from the "anode" side of a fuel cell to the "cathode" side of the fuel cell while preventing passage therethrough of the hydrogen and air/oxygen gases. Some artisans consider the acronym "PEM" to represent "Polymer Electrolyte Membrane." The direction, from anode to cathode, of flow of protons serves as the basis for labeling an "anode" side and a "cathode" side of every layer in the fuel cell (and fuel cell assembly or stack, as described below).

An individual fuel cell generally has multiple, transversely extending layers assembled in a longitudinal direction. Furthermore, fluid manifolds extend longitudinally through the periphery of each fuel cell. The fluid manifolds "service" the fluids for each fuel cell, as described below.

As is well-known in the art, the fluid manifolds distribute hydrogen and air/oxygen to, and remove unused hydrogen and air/oxygen as well as product water from, fluid flow plates of the fuel cell. Often, the hydrogen and air/oxygen gases are humidified before entering the manifolds in order to carry water for humidification of the PEM of the fuel cell. Furthermore, the fluid manifolds circulate water for cooling.

Typically, the chemical reactions of a single fuel cell generate a relatively small voltage (e.g., 0.4 to 0.9 volts). In order to provide external usage of desirable voltages such as between 1 and 400 volts, one usually connects a plurality of the fuel cells in series. That is, one assembles the plurality of fuel cells in a "stack."

In a fuel cell assembly or stack, all layers that extend to the periphery of the fuel cells have holes therethrough for alignment and formation of the fluid manifolds. Further, gaskets seal these holes and cooperate with the longitudinal extents of the layers for completion of the fluid manifolds.

Generally, the longitudinally "first" and "last" fluid flow plates, at the respective "anode" and "cathode" ends of the stack of fuel cells, are electrically coupled to "anode" and "cathode" current collector plates, respectively. One can form the current collector plates from, for instance, copper.

Furthermore, the "cathode" current collector plate is coupled to an external load which is in turn coupled to the "anode" current collector plate for completion of a circuit. One makes use of the fuel cell assembly by this connection of the external load within the conduction path between the "cathode" and "anode" current collector plates. For example, the electrical connections can employ wire or cable.

Outward from each current collector plate in a fuel cell assembly usually appear a separate insulating layer followed by an end plate. The end plates typically have holes for receiving tie bolts that hold the fuel cells in compression between the end plates. For example, the end plates ("anode" and "cathode") can be made of aluminum.

Various configurations exist for servicing the fluids involved in the chemical reactions and cooling which desirably occur in the fuel cell assembly. In one known design, the current collector plate, insulating layer, and end plate each have therethrough manifold holes. This configuration presents a risk to the fuel cells, particularly to each PEM, of contamination by metallic ions from the end plate or the current collector plate. Furthermore, the holes in the current collector plate can shunt electrical current.

Another design includes a bypass for servicing fluid to the fuel cells. In particular, the bypass requires a separate mechanical structure for transmission of fluid around the current collector plate, insulating layer, and end plate. By employing additional plates, tubes, and/or seals, this bypass adds complexity and increases material usage.

A number of configurations exist for externally conducting the electrical current of the fuel cell assembly. One design provides an outwardly (e.g., upwardly) extending neck on a current collector plate. This neck provides a contact surface for conduction of the electrical current to a connecting cable or bus bar. An insulation layer followed by an end plate appear outwardly from this current collector plate.

Another design provides insulated connection of an external load through an end plate. In particular, a sleeve insulates a terminal lug as it passes through the end plate and the insulator for connection to the current collector plate. Such a design is disclosed in U.S. Pat. No. 4,719,157 to Tsutsumi et al. (entitled "Fuel Cell Stack Assembly," issued Jan. 12, 1988, and assigned to Sanyo Electric Company).

Thus, a need exists for a new end plate construction that not only provides structural support for a fuel cell assembly, but also facilitates current conduction and fluid service without the complexity, potential contamination hazards, electrical shorting problems, and other drawbacks attendant in prior designs.

SUMMARY OF THE INVENTION

Pursuant to the present invention, the shortcomings of the prior art are overcome and additional advantages provided through the provision of a unitary end plate which serves not only as a compressing structural end support of a fuel cell assembly, but also as an electrically isolated current conductor and end connector. Advantageously, the end plate can further include isolated fluid service passage(s) and structural member receiving passage(s) therethrough.

According to the present invention, a current conducting end plate has a conductive body with isolating material formed integrally therewith.

The conductive body has a first surface, a second surface opposite the first surface, and an electrical connector. The first surface has an exposed portion for conducting current between a working section of the fuel cell assembly and the electrical connector. The isolating material is positioned on at least a portion of the second surface.

The conductive body can have a support passage extending therethrough for receiving a structural member of the fuel cell assembly. Isolating material can electrically isolate the conductive body from the structural member. This isolating material can be formed integrally with the conductive body.

The first surface can have a first region contiguous with the support passage. Further, the second surface can have a second region contiguous with the support passage. Isolating material can be positioned in the support passage and on the first and second regions. The first region can have one or more recesses for receiving this isolating material.

The conductive body can have a service passage extending therethrough for servicing one or more fluids for the fuel cell assembly. Isolating material can chemically isolate the one or more fluids from the conductive body. This isolating material can also electrically isolate the conductive body from the one or more fluids. Moreover, this isolating material can be formed integrally with the conductive body.

The first surface can have a first part contiguous with the service passage. In addition, the second surface can have a second part contiguous with the service passage. The isolating material positioned for chemically isolating the one or more fluids from the conductive body can be positioned in the service passage and on the first and second parts. This first part can have one or more recesses for receiving the isolating material.

The same material can form the various isolating materials recited herein. In addition, isolating material can be positioned on the conductive body for isolating all of the conductive body except for the exposed portion of the first surface and an electrical contact surface of the electrical connector.

In another aspect of the present invention, a fuel cell assembly includes first and second end plates of the novel character described herein, with a working section therebetween. A structural member has first and second sections to be received by support passages in the first and second end plates, respectively. Isolating material electrically isolates the end plates from the structural member. Isolated fluid service passage(s) can also be provided in the end plate(s). The working section can include one or more PEM-type fuel cells.

The invention further contemplates a method for providing fluid service to a fuel cell assembly through provision of isolated service passage(s) extending through a conductive body of end plate(s) of the assembly, and for providing structural support to the assembly through provision of isolated support passage(s) extending through the conductive body of the end plate(s).

Thus, the present invention advantageously provides a lighter, more compact fuel cell assembly with well-insulated/isolated and convenient electrical connections, fluid service passages, and support passages.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be readily understood from the following detailed description of preferred embodiments taken in conjunction with the accompanying drawings in which:

BEST MODE FOR CARRYING OUT THE INVENTION

In accordance with the principles of the present invention, a fuel cell assembly is provided in which a current conducting end plate not only provides structural support for the assembly in a lighter, more compact fashion, but also facilitates current conduction and fluid service without the complexity, potential contamination hazards, electrical shorting problems, and other drawbacks attendant in prior designs.

Figure 1:
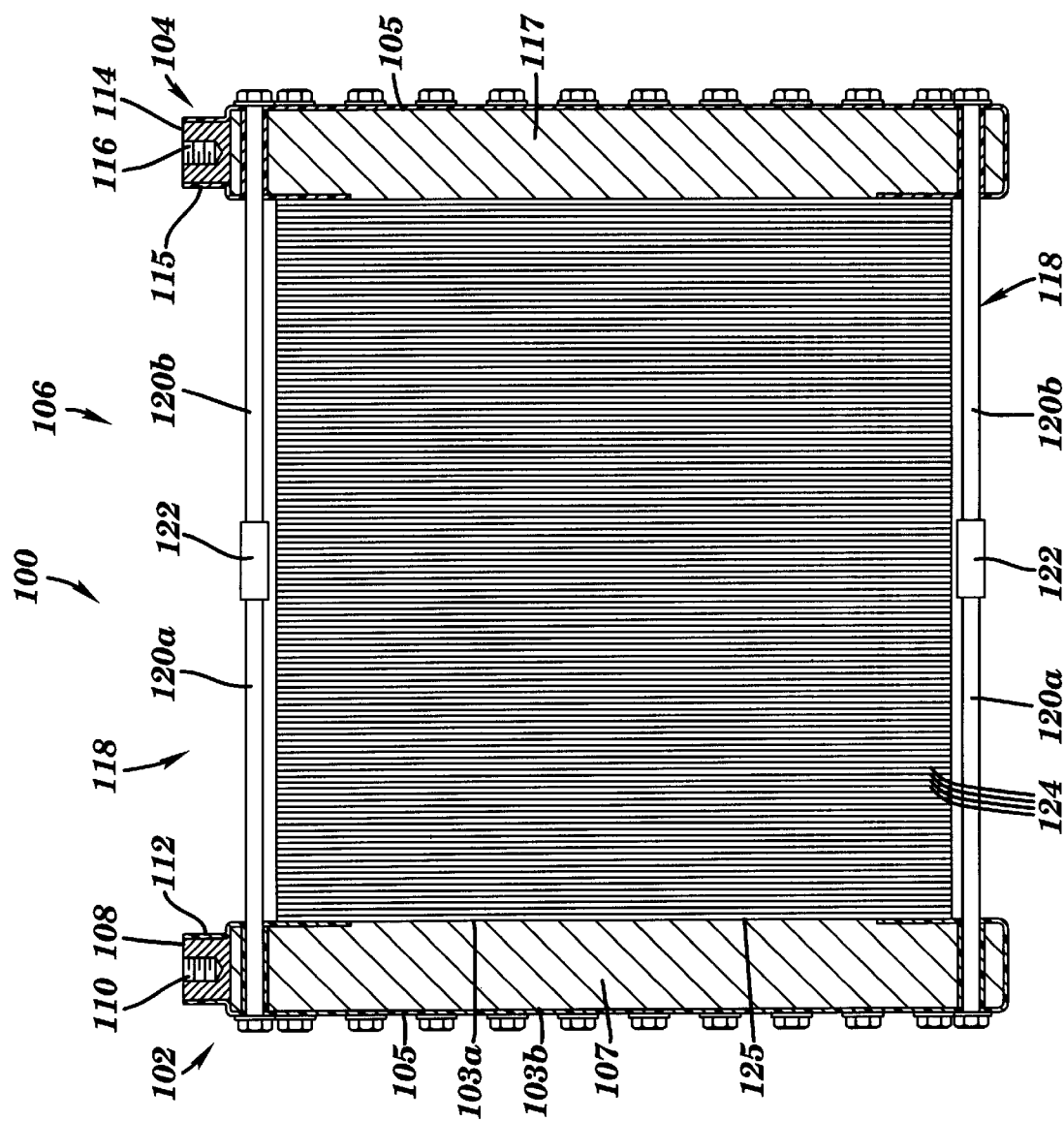
FIG. 1 is a front, sectional elevation view of one example of a fuel cell assembly incorporating and using the current conducting end plate of the present invention.

One example of a current conducting end plate of a fuel cell assembly incorporating and using the novel features of the present invention is depicted in FIG. 1 and described in detail herein.

In this exemplary embodiment, a fuel cell assembly 100 includes a first current conducting end plate 102, a second current conducting end plate 104, and a working section 106 therebetween. The end plates 102 and 104 have respective conductive bodies 107 and 117, each defined by a pair of generally parallel, opposed surfaces. For instance, the end plates can be machined from a conductive metal such as aluminum. Also, isolating material 105 is positioned on a number of surfaces of the conductive bodies, as discussed more fully below.

The following description with respect to the first end plate extends appropriately to the second end plate, as will be understood by those skilled in the art.

Conductive body 107 of first end plate 102 includes first surface 103a, second surface 103b, and first electrical connector 108. The first surface is suited to provide electrical conduction between working section 106 and the first electrical connector, as described herein. Further, the first surface faces inwardly and contains exposed portion 125 that interfaces with working section 106. The second surface faces outwardly, opposite to the inwardly facing surface. Namely, surface 103b is located on an outer side of end plate 102.

First electrical connector 108 of conductive body 107 includes first electrical contact surface 110 for conduction to an external connection (not shown). For instance, the first electrical connector can be formed as an outwardly (e.g., upwardly) extending neck 112 that includes a threaded hole for attachment of a connecting cable or bus bar (not shown). Similarly, conductive body 117 of second end plate 104 can include second electrical connector 114 (e.g., in the form of protruding neck 115) having second electrical contact surface 116 for conduction between the working section and an external connection (not shown).

In one preferred embodiment, conductive body 107 of end plate 102 advantageously has isolating material 105 all over except on exposed portion 125 and electrical contact surface 110 of electrical connector 108.

A number of structural members 118 join first and second end plates 102 and 104. For instance, the end plates can each include a support passage 119 (FIG. 2) for receiving a respective section of given structural member 118.

For exemplary purposes, FIG. 1 depicts structural member 118 as including axial tie bolts 120a and 120b coupled by bolt coupling 122. The structural members contribute support to assembly 100 by holding working section 106 between first and second end plates 102 and 104. Preferably, the structural members do not touch the working section. The structural members allow the first and second end plates to maintain a desired position of the working section therebetween through compressive force. In particular, working section 106 is typically compressed longitudinally during formation of assembly 100, as is well-known in the art. Thereafter, end plates 102 and 104 cooperate with structural members 118 in supporting the working section.

Furthermore, working section 106 includes a number of layers 124. A plurality of the layers preferably form one or more PEM-type fuel cells. The construction of such fuel cells is known in the art. By externally connecting a load between first and second electrical contact surfaces 108 and 116, one can complete a circuit for use of current generated by the one or more PEM-type fuel cells. Namely, one can couple the first electrical contact surface to an external load (not shown) which is in turn coupled to the second electrical contact surface.

Figure 2:
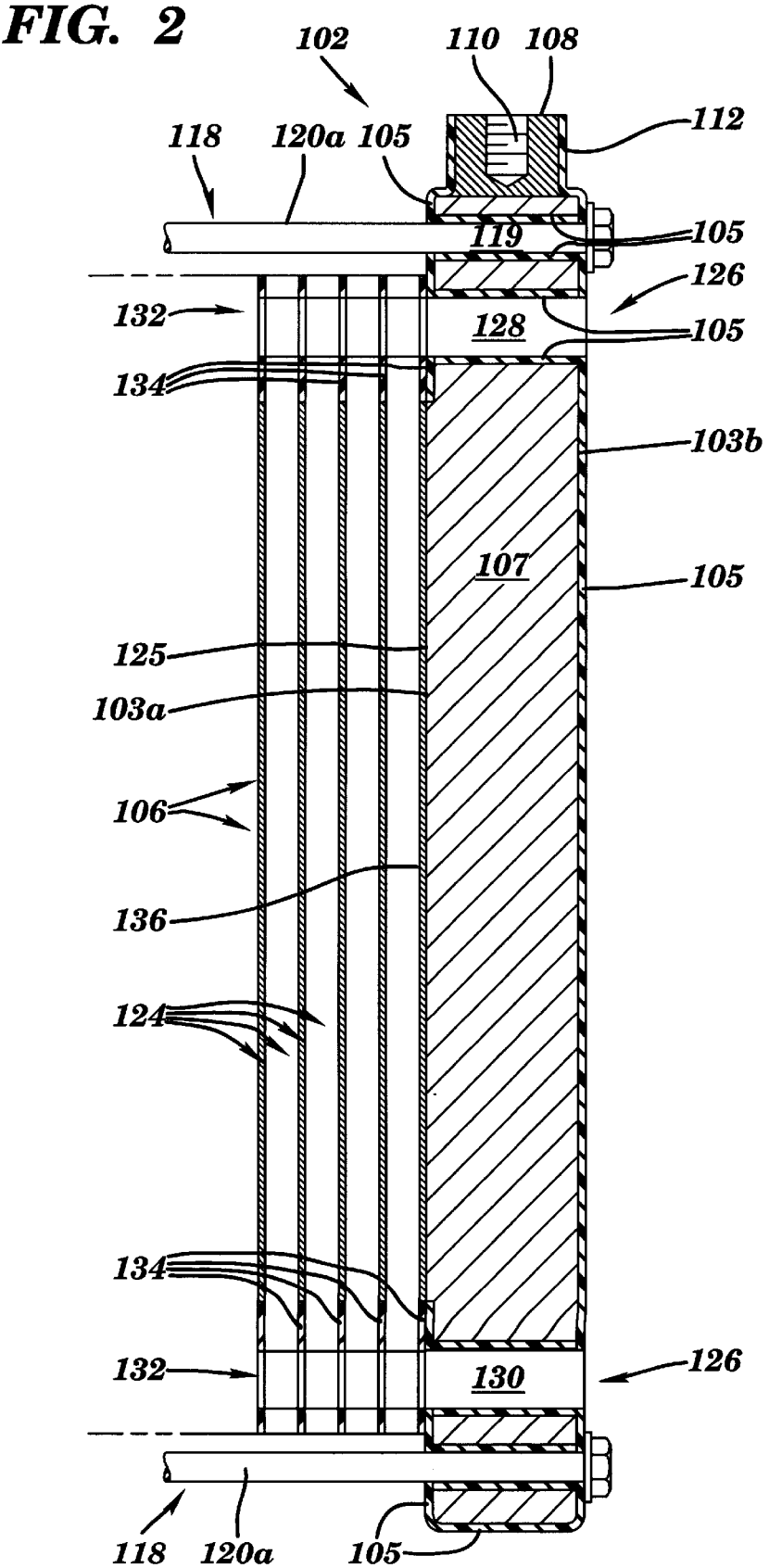
FIG. 2 is a rear, sectional partial view of the fuel cell assembly of FIG. 1 showing details of the current conducting end plate.

As depicted in FIG. 2 for purposes of illustration, support passage 119 can extend through conductive body 107 of first end plate 102. Further, the support passage receives structural member 118. In the illustrated example, the support passage receives axial tie bolt 120a. A rod portion of the axial tie bolt extends through the support passage, with a head portion of the axial tie bolt abutting isolating material 105 on outward surface 103b of conductive body 107 of the first end plate. As depicted in FIG. 1, bolt coupling 122 can secure the axial tie bolt to companion axial tie bolt 120b received by second end plate 104.

Isolating material 105 is also advantageously positioned in support passage 119. In one example, the isolating material can be electrically insulating/isolating, chemically isolating, or both. For instance, the isolating material can be Nylon 11.

Advantageously, the positioning of isolating material 105 in support passage 119 electrically isolates conductive body 107 from structural member 118. This isolating material desirably prevents shunting of electrical current (generated by working section 106) during conduction between conductive body 107 and first electrical connector 108. Moreover, the isolating material can provide chemical isolation in the support passage.

Surface 103a of conductive body 107 of end plate 102 includes exposed (i.e., non-isolated) portion 125 for conduction of electrical current therethrough, as will be understood by those skilled in the art. Isolating material 105 on surface 103a can surround (e.g., defines or delineates) the exposed portion.

In one preferred embodiment, exposed portion 125 and isolating material 105 therearound form a flush interface with working section 106. Immediately inward from this interface, layer 124 of the working section can include frame gasket 134 about a conductive insert 136. For instance, the gasket can be made from a material manufactured by E. I. Du Pont De Nemours Company and sold under the trademark TEFLON®. Further, the conductive insert can be formed from a material manufactured by UCAR Carbon Company (Cleveland, Ohio) and sold under the trade designation GRAFOIL. These exemplary materials are well-known in the art. In one alternative embodiment, multiple O-ring gaskets could be used instead of a given frame gasket.

As will be understood by those skilled in the art, succeeding inward layers 124 of working section 106 can form a selected number of PEM-type fuel cells interspersed with a desired number of cooling plates. In one embodiment, every layer includes a frame gasket 134 as part of fluid manifolds 132 for sealing the fluids that service the working section, as described herein.

First current conducting end plate 102 can have a number of service passages 126. In accordance with the present invention, isolating material 105 is positioned in a given service passage. This positioning of the isolating material in the service passage chemically isolates one or more fluids carried therethrough from conductive body 107. Further, the isolating material also serves to electrically isolate conductive body 107 from the one or more fluids carried through the service passage.

Service passages 126 participate with layers 124 of working section 106 in forming a number of fluid manifolds 132. In one example, assembly 100 has any desired number of the fluid manifolds (e.g., inlet and outlet manifolds) that include various service passages for supplying, returning, and otherwise circulating fluids for the working section. Furthermore, a number of the service passages could easily extend through second current conducting end plate 104.

One or more fluids can be serviced through cooperating inlet and outlet manifolds 132 that each include one of first and second service passages 128 and 130. Also, one or more fluids could be serviced through additional cooperating manifolds 132 that include other service passages 126 in first current conducting end plate 102. Furthermore, one or more fluids could easily be serviced through cooperating manifolds 132 that include service passages 126 in second current conducting end plate 104.

Of course, end plates 102 and 104 can have any desired number of service passages 126. For example, the first conducting end plate could easily have additional, fewer, or no service passages 126. In addition, a given service passage could service multiple fluid manifolds 132. Moreover, a given inlet manifold 132 that includes a particular service passage 126 in one of end plates 102 and 104 could easily cooperate with an outlet manifold that includes another service passage in the opposite end plate.

In one preferred embodiment, working section 106 includes one or more PEM-type fuel cells whose fluids are serviced by service passages 126. As will be understood by those skilled in the art, fluid manifolds 132 formed from service passages 126 can service hydrogen, air/oxygen, coolant, and water for the one or more PEM-type fuel cells.

For example, inlet manifold 132 could supply humidified hydrogen to the one or more PEM-type fuel cells. Also, companion outlet manifold 132 could return unused hydrogen, humidified or not. As will be understood by those skilled in the art, first service passage 128 as part of the inlet manifold could receive hydrogen therethrough from a source (not shown) external to assembly 100. Moreover, second service passage 130 as part of the outlet manifold could return hydrogen therethrough to an external destination (not shown). Such external sources and destinations can be interconnected to recirculate all, a desired portion, or none of one or more given fluids, as is well-known in the art. For example, these types of systems can be formed for fluids such as air/oxygen and water.

One could choose to recirculate hydrogen and any humidification water. Also, one could choose to not circulate reactant air/oxygen while recirculating product and humidification water therein. Moreover, one could choose to recirculate air/oxygen and bleed out accumulated components (e.g., carbon dioxide) therefrom.

Figure 3:
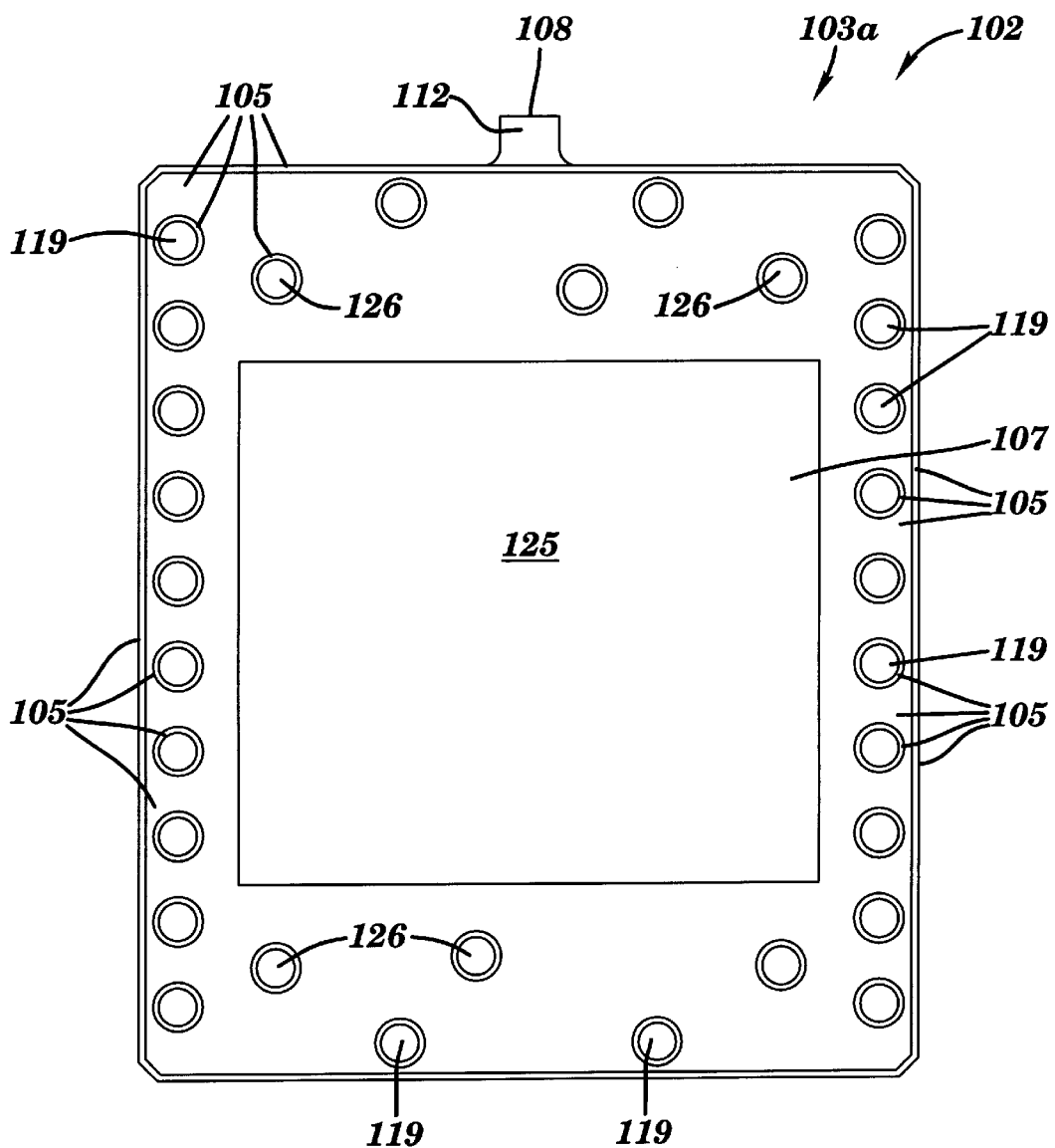
FIG. 3 is a view of an interior face of the current conducting end plate of FIG. 1.

As represented in FIG. 3, surface 103a of conductive body 107, which includes exposed portion 125, also includes recesses about each of support and service passages 119 and 126 and into which isolating material 105 can advantageously be positioned. Of course, one can choose any appropriate size for the exposed portion. Likewise, one can form recesses in surface 103b of conductive body 107.

Also, conductive body 107 can have parts or regions on each of oppositely facing surfaces 103a and 103b contiguous with each of support and service passages 119 and 126. In these parts or regions are formed the above-mentioned recesses that receive isolating material 105.

Conductive bodies 107 and 117 provide both electrical conductivity and structural strength. So, current conducting end plates 102 and 104 advantageously provide superior performance over the three layers used previously, namely, the current collector plate, the structural end plate, and the insulating layer interposed therebetween. In particular, the current conducting end plate of the present invention performs all of the electrical insulation functions of the three layers in addition to providing chemical isolation not provided by those three layers. Further, the current conducting end plate desirably provides chemical isolation without the previously required extra material expense and increased formation complexity of a bypass around the three layers.

A technique for forming isolating material 105 on and integrally with selected surfaces of conductive body 107 will now be described. For example, one can support conductive body 107 by inserting a fixture (not shown) into a slot in neck 112 while applying isolating material 105 to all remaining surfaces of conductive body 107. Next, in order to form surface 103a, one can grind end plate 102 for removal of the isolating material until reaching a position at which exposed portion 125 is uncovered and the isolating material remains in the recesses around support and service passages 119 and 126. A jacket of the isolating material will remain all around the perimeter of this exposed portion as well as in support and service passages 119 and 126 to the thickness the isolating material was applied to these adjacent surfaces. Preferably, one also grinds the isolating material from the terminating surface of neck 112 in order to provide a clean interface between electrical connector 108 and the external connection (not shown). In addition, one can smooth or otherwise machine the isolation material in passages 119 and 126 and elsewhere on end plate 102, as desired.

In order to form the recesses, one can make a counter-bore in surface 103a at each of passages 119 and 126 in conductive body 107. As isolating material 105 is applied, it will desirably extend through the corresponding passage and spread out over the counter-bore as well as the remainder of transverse surface 103a.

With respect to service passages 126, isolating material 105 advantageously creates a chemically and electrically isolating conduit for isolation of any reactants passing therethrough. This prevents the reactants from picking up ions from conductive body 107 of end plate 102. Also, the isolating material in the recesses allows formation of a seal upon compression with downstream fittings (e.g., frame gasket 134) in order to secure delivery of the one or more fluids. Furthermore, isolating material 105 desirably prevents shunting by the one or more fluids of electrical current in conductive body 107.

With respect to s upport passages 119, isolating material 105 prevents shunting of the electrical current in conductive body 107 to a section of structural member 118 in a given support passage or on an outer surface (e.g., surfaces 103a, 103b).

Isolating material 105 allows current conducting end plate 102 to provide structural support to assembly 100 at the same time it conducts current of, and services fluids for, working section 106. Furthermore, the present invention can provide complete electrical and/or chemical isolation of end plate 102 during operation. Where one attaches a connecting cable to electrical connector 108, a molded end on the connecting cable can seal around the sides of neck 112. Moreover, the working section effectively seals exposed portion 125 as part of fuel cell assembly 100.

The description herein of any feature, characteristic, structure, and/or function or the like of one of end plates 102 and 104 can easily be modified with respect to that end plate, and/or applied in any appropriate degree to, and/or to any desired extent of, that end plate or the other one of the end plates.

Numerous alternative embodiments of the present invention exist. For instance, any number of support and service passages 119 and 126 could easily be formed as only partially enclosed by or contained in one of end plates 102 and 104. Moreover, support and service passages 119 and 126 could easily extend in any appropriate direction. Also, structural member 118 could easily be formed from any desired number of sections. For instance, a single axial tie rod 120a could extend through support passages 119 in each of end plates 102 and 104 with a bolt head abutting isolating material 105 on outer surface 103b of one of the end plates and a nut fastened against isolating material 105 on outer surface 103b of the other end plate. Further, structural member 118 could easily be formed as a cable-type member.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A current conducting end plate for a fuel cell assembly, said end plate comprising:
   a conductive body having a first surface, a second surface opposite said first surface, and an electrical connector, said first surface having an exposed portion for conducting current between a working section of said assembly and said electrical connector, said second surface configured to be located at an exterior of said fuel cell assembly; and
   an isolating material coating on at least a portion of said second surface.

2. The end plate of claim 1, wherein said conductive body includes a support passage extending therethrough for receiving a structural member of said assembly; and
   further comprising isolating material positioned for electrically isolating said conductive body from said structural member.

3. The end plate of claim 2, wherein said conductive body and said isolating material positioned for electrically isolating said conductive body from said structural member are unitary.

4. The end plate of claim 2, wherein said first surface includes a first region contiguous with said support passage, wherein said second surface includes a second region contiguous with said support passage, wherein said isolating material positioned for electrically isolating said conductive body from said structural member is positioned in said support passage and on said first and second regions.

5. The end plate of claim 4, wherein said first region includes one or more recesses for receiving said isolating material positioned for electrically isolating said conductive body from said structural member.

6. The end plate of claim 2, wherein said conductive body includes a service passage extending therethrough for servicing one or more fluids for said assembly; and further comprising isolating material positioned for chemically isolating said one or more fluids from said conductive body.

7. The end plate of claim 6, wherein said isolating material positioned for chemically isolating said one or more fluids from said conductive body also serves to electrically isolate said conductive body from said one or more fluids.

8. The end plate of claim 6, wherein said conductive body and said isolating material positioned for chemically isolating said one or more fluids from said conductive body are unitary.

9. The end plate of claim 6, wherein said first surface includes a first part contiguous with said service passage, wherein said second surface includes a second part contiguous with said service passage, wherein said isolating material positioned for chemically isolating said one or more fluids from said conductive body is positioned in said service passage and on said first and second parts.

10. The end plate of claim 9, wherein said first part includes one or more recesses for receiving said isolating material positioned for chemically isolating said one or more fluids from said conductive body.

11. The end plate of claim 6, wherein said isolating material positioned for electrically isolating said conductive body from said structural member and said isolating material positioned for chemically isolating said one or more fluids from said conductive body comprise the same material.

12. The end plate of claim 1, wherein said conductive body includes a service passage extending therethrough for servicing one or more fluids for said assembly; and further comprising isolating material positioned in said service passage for isolating said one or more fluids from said conductive body.

13. The end plate of claim 12, further comprising isolating material on said conductive body for isolating all of said conductive body except for said exposed portion of said first surface and an electrical contact surface of said electrical connector.

14. The end plate of claim 1, wherein said isolating material coating entirely covers said second surface.

15. The end plate of claim 14, wherein said isolating material coating comprises nylon.

16. A current conducting end plate for a fuel cell assembly, said end plate comprising:

a conductive body having a first surface, a second surface opposite said first surface, and an electrical connector, said first surface having an exposed portion for conducting current between a working section of said assembly and said electrical connector, said second surface configured to be located at an exterior of said fuel cell assembly; and isolating material on at least a portion of said second surface;

wherein said conductive body and said isolating material comprise a preformed unitary structure.

17. The end plate of claim 16, wherein said exposed portion comprises a non-peripheral portion of said first surface.

18. The end plate of claim 16, wherein said conductive body comprises a solid portion, said solid portion comprising said first surface and said second surface.

19. A fuel cell assembly, comprising:

a working section;

a first end plate, comprising:

a conductive body having a first surface, a second surface opposite said first surface, and an electrical connector, said first surface having an exposed portion for conducting current between said working section and said electrical connector, said second surface located at an exterior of said fuel cell assembly; and an isolating coating on at least a portion of said second surface; and a second end plate, comprising:

a conductive body having a first surface, a second surface opposite said first surface, and an electrical connector, said first surface having an exposed portion for conducting current between said electrical connector and said working section; and isolating material on at least a portion of said second surface, wherein said conductive body and said isolating material are unitary.

20. The assembly of claim 19, wherein at least one end plate of said first and second end plates includes a service passage extending through said conductive body of said at least one end plate for servicing one or more fluids for said working section; and further comprising isolating material positioned for chemically isolating said one or more fluids from said conductive body of said at least one end plate.

21. The assembly of claim 19, further comprising a structural member having first and second sections, wherein said conductive body of said first end plate includes a support passage extending therethrough for receiving said first section of said structural member, wherein said conductive body of said second end plate includes a support passage extending therethrough for receiving said second section of said structural member; and further comprising first isolating material positioned for electrically isolating said conductive body of said first end plate from said first section of said structural member; and second isolating material positioned for electrically isolating said conductive body of said second end plate from said second section of said structural member.

22. The assembly of claim 21, wherein at least one end plate of said first and second end plates includes a service passage extending through said conductive body of said at least one end plate for servicing one or more fluids for said working section; and further comprising isolating material positioned for chemically isolating said one or more fluids from said conductive body of said at least one end plate.

23. The assembly of claim 22, wherein said working section includes one or more PEM-type fuel cells.

24. A method of servicing a fuel cell assembly, said method comprising:

providing a plate including a conductive body having a surface and an electrical connector, said surface having an exposed portion for conducting current between a working section of said assembly and said electrical connector;

extending a service passage through said conductive body for servicing one or more fluids for said assembly;

providing isolating material to isolate said one or more fluids from said conductive body, wherein said providing of said isolating material includes applying an isolating material coating to said service passage; and wherein said conductive body and said isolating material are unitary.

25. The method of claim 24 in combination with the steps of:

extending a support passage through said conductive body for receiving a structural member of said assembly; and isolating said conductive body from said structural member.

26. The method of claim 24, wherein the providing of said isolating material comprises substantially preventing contamination of said one or more fluids by said conductive body.

27. The method of claim 24, wherein the providing of said isolating material includes locating a portion of said isolating material in said service passage.

28. The method of claim 24, wherein said surface includes a part contiguous with said service passage, and wherein the providing of said isolating material includes locating a portion of said isolating material on said part.

29. The method of claim 24, wherein said surface comprises a first surface, wherein said plate comprises an end plate for said fuel cell assembly, said end plate including a second surface located at an outer side of said end plate, said second surface including a part contiguous with said service passage, and wherein the providing of said isolating material includes locating a portion of said isolating material on said part.

* * * * *